(12) United States Patent
Tamura et al.

(10) Patent No.: US 10,641,938 B2
(45) Date of Patent: May 5, 2020

(54) FILM FORMING COMPOSITION, HARDCOAT FILM, POLARIZING PLATE, AND METHOD FOR MANUFACTURING HYDROPHILIZED HARDCOAT FILM

(71) Applicant: FUJIFILM Corporation, Tokyo (JP)

(72) Inventors: Akio Tamura, Kanagawa (JP); Taketo Otani, Kanagawa (JP); Reiko Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 16/005,845

(22) Filed: Jun. 12, 2018

(65) Prior Publication Data

US 2018/0292589 A1 Oct. 11, 2018

Related U.S. Application Data

(63) Continuation of application No. PCT/JP2016/086622, filed on Dec. 8, 2016.

(30) Foreign Application Priority Data

Dec. 18, 2015 (JP) .................................. 2015-247995

(51) Int. Cl.
| | | |
|---|---|---|
| G02B 5/30 | (2006.01) | |
| C08F 220/22 | (2006.01) | |
| C08J 7/04 | (2020.01) | |
| C08F 265/06 | (2006.01) | |
| B32B 27/30 | (2006.01) | |
| C09D 4/06 | (2006.01) | |
| C09D 133/16 | (2006.01) | |
| G02B 1/14 | (2015.01) | |
| C09D 127/20 | (2006.01) | |
| C08L 27/12 | (2006.01) | |
| C08F 299/02 | (2006.01) | |
| C08G 81/02 | (2006.01) | |

(52) U.S. Cl.
CPC .............. *G02B 5/305* (2013.01); *B32B 27/30* (2013.01); *B32B 27/304* (2013.01); *C08F 220/22* (2013.01); *C08F 265/06* (2013.01); *C08J 7/04* (2013.01); *C08J 7/0427* (2020.01); *C08L 27/12* (2013.01); *C09D 4/06* (2013.01); *C09D 127/20* (2013.01); *C09D 133/16* (2013.01); *G02B 1/14* (2015.01); *B32B 2551/00* (2013.01); *C08F 299/026* (2013.01); *C08F 2800/20* (2013.01); *C08G 81/025* (2013.01); *C08J 2301/12* (2013.01); *C08J 2433/14* (2013.01); *C08J 2433/16* (2013.01); *C08L 2203/16* (2013.01); *Y10T 428/105* (2015.01); *Y10T 428/1036* (2015.01); *Y10T 428/1059* (2015.01)

(58) Field of Classification Search
CPC .......... G02B 5/305; G02B 1/14; B32B 27/30; B32B 27/304; B32B 2551/00; C09D 4/06; C09D 127/20; C09D 133/16; C08F 265/06; C08F 220/22; C08L 2203/16; C08L 27/12; C08J 2433/16; C08J 2433/704; Y10T 428/1036; Y10T 428/1059; Y10T 428/105
USPC ........ 428/1.3, 1.33, 1.5, 1.54, 422; 349/137; 257/437, E31.119
See application file for complete search history.

(56) References Cited

FOREIGN PATENT DOCUMENTS

| JP | 01106001 A | * | 4/1989 |
|---|---|---|---|
| JP | H01-106001 A | | 4/1989 |
| JP | 2004-155847 | | 6/2004 |
| JP | 2004155847 A | * | 6/2004 |
| JP | 2004-331812 | | 11/2004 |
| JP | 2005-248116 | | 9/2005 |
| JP | 2007-016083 A | | 1/2007 |
| JP | 2007-246715 A | | 9/2007 |

(Continued)

OTHER PUBLICATIONS

International Search Report issued in PCT/JP2016/086622 dated Feb. 7, 2017.

(Continued)

*Primary Examiner* — Ruiyun Zhang
(74) *Attorney, Agent, or Firm* — Edwards Neils LLC; Jean C. Edwards, Esq.

(57) ABSTRACT

According to the present invention, there are provided a film forming composition, which contains a polymer having a repeating unit represented by General Formula (I) and a curable compound, an optical film having a film formed of the composition, a hardcoat film, a polarizing plate, and a method for manufacturing a hydrophilized hardcoat film. In General Formula (I), $R^1$ represents a hydrogen atom or an alkyl group having 1 to 20 carbon atoms, L represents an ester bond, an ether bond, a phenylene group, or an amide bond, $R^2$ and $R^4$ each independently represent a hydrogen atom, a halogen atom, an alkyl group having 1 to 20 carbon atoms, or a halogenated alkyl group having 1 to 20 carbon atoms, and $R^3$ represents a hydrogen atom or a substituent.

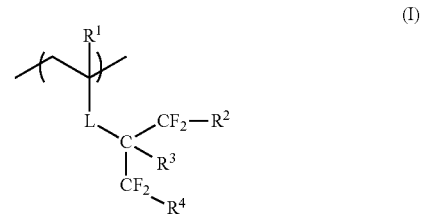

(I)

7 Claims, No Drawings

(56) References Cited

FOREIGN PATENT DOCUMENTS

| | | |
|---|---|---|
| JP | 2013-245289 A | 12/2013 |
| JP | 2014-137454 A | 7/2014 |

OTHER PUBLICATIONS

Written Opinion issued in PCT/JP2016/086622 dated Feb. 7, 2017.
International Preliminary Report on Patentability completed by WIPO dated Jun. 19, 2018, in connection with International Patent Application No. PCT/JP2016/086622.
Notification of Reasons for Refusal issued by the Japan Patent Office dated Apr. 16, 2019 in connection with Japanese Patent Application No. 2015-247995.

* cited by examiner

FILM FORMING COMPOSITION, HARDCOAT FILM, POLARIZING PLATE, AND METHOD FOR MANUFACTURING HYDROPHILIZED HARDCOAT FILM

CROSS-REFERENCE TO RELATED APPLICATIONS

This is a continuation of International Application No. PCT/JP2016/086622 filed on Dec. 8, 2016, which was published under Article 21(2) in Japanese, and which claims priority under 35 U.S.C. § 119(a) from Japanese Patent Application No. 2015-247995 filed on Dec. 18, 2015. The above applications are hereby expressly incorporated by reference, in their entirety, into the present application.

BACKGROUND OF THE INVENTION

1. Field of the Invention

The present invention relates to a film forming composition, an optical film, a hardcoat film, a polarizing plate, and a method for manufacturing a hydrophilized hardcoat film.

2. Description of the Related Art

In image display devices such as a display device using a cathode ray tube (CRT), a plasma display panel (PDP), an electroluminescence display (ELD), a vacuum fluorescent display (VFD), a field emission display (FED), and a liquid crystal display (LCD), it is preferable that a hardcoat film having a hardcoat layer on a support is disposed on a display surface so as to prevent the display surface from being scratched.

Generally, a leveling agent is added to the hardcoat layer so as to improve the surface condition uniformity of a coating film.

Furthermore, in a case where a hardcoat film, which includes a cellulose acylate film as a support and a hardcoat layer on the support, is used as a polarizing plate protective film, usually, the hardcoat film is subjected to a saponification treatment by using an aqueous sodium hydroxide solution or the like and then bonded to a polarizer (for example, see JP2004-331812A).

JP2005-248116A describes a fluorine-containing polymer having a specific structure and a fluorine-containing adhesiveness enhancer which can reversibly change the surface of a coat into a hydrophilic surface from a hydrophobic surface depending on the external environment by using the aforementioned polymer.

In addition, JP2007-16083A describes a fluorine-containing polymer having excellent transparency, heat resistance, and mechanical strength and extremely low hygroscopicity.

SUMMARY OF THE INVENTION

In recent years, as the image display devices have been used for various purposes such as touch panels, other layers (for example, an antistatic layer, a layer of high refractive index, a layer of low refractive index, a phase difference layer, and the like) having various functions have been required to be laminated on the hardcoat layer. Therefore, there is a demand for a hardcoat layer which is easily laminated with other layers, that is, a hardcoat layer which exhibits excellent lamination properties with respect to other layers.

In a case where the surface of a hardcoat layer is coated with a resin composition for forming other layers such that other layers are laminated, provided that the surface of the hardcoat layer has low hydrophilicity, unfortunately, the resin composition for forming other layers is repelled without wetting and spreading on the surface, or thickness unevenness occurs in other layers.

Generally, the leveling agent, which is added to the hardcoat layer from the viewpoint of the surface condition uniformity, is a surfactant having hydrophobicity such as a fluorine-containing polymer, and accordingly, the hydrophilicity of the surface of the hardcoat layer decreases.

As a result, a trade-off between the surface condition uniformity of the hardcoat layer and the lamination properties with respect to other layers becomes a problem.

Through an examination, the inventors of the present invention have found that the film, in which the fluorine-containing polymer described in JP2005-248116A is used, does not exhibit sufficient lamination properties with respect to other layers.

Furthermore, although JP2007-16083A describes that it is possible to obtain a polymer having excellent transparency, heat resistance, and mechanical strength and extremely low hygroscopicity, it does not describe the lamination properties with respect to other layers at all.

An object of the present invention based on the issues described above, that is, a problem to be solved by the present invention is to provide a film forming composition, which makes it possible to form a film having excellent surface condition uniformity and being able to be improved in terms of lamination properties with respect to other layers by a simple treatment, a hardcoat film having a film formed of the composition, a polarizing plate, and a method for manufacturing a hydrophilized hardcoat film which has excellent surface condition uniformity and exhibits excellent lamination properties with respect to other layers.

The film forming composition of the present invention contains a fluorine-containing polymer having a repeating unit represented by General Formula (I). Therefore, the composition can form a film having excellent surface condition uniformity and hydrophilize the film surface by treating the film with an aqueous alkali solution (alkali treatment). The polymer represented by General Formula (I) has a fluorine-containing group having a branched structure on a side chain. Therefore, the polymer has especially strong electron-withdrawing properties, is easily hydrolyzed by the alkali treatment, and the fluorine-containing group is eliminated. The film surface is considered to be hydrophilized by the above mechanism. Furthermore, it is considered that after the hydrolysis, sometimes the polymer may be converted into a hydrophilic group such as a carboxyl group, and hence the film surface is hydrophilized.

It is considered that accordingly, in a case where another film (upper layer) is laminated on a film (lower layer) formed of the film forming composition of the present invention, even though coating is performed using the composition for forming the upper layer, the composition is not repelled, and a uniform upper layer exhibiting excellent adhesiveness with respect to the lower layer can be formed.

The inventors of the present invention have also found that even in a case where a surface panel and a display module to be used as a touch panel are bonded to each other by means of filling a space therebetween with an optically clear resin (OCR), by using the film forming composition of the present invention in a hardcoat layer of the surface of the display module, it is possible to improve the wettability and the adhesiveness of OCR.

That is, the inventors of the present invention have found that the aforementioned problem can be solved by the following means.

<1> A film forming composition comprising a polymer having a repeating unit represented by General Formula (I) and a curable compound.

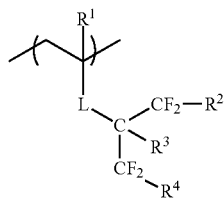

(I)

In General Formula (I), $R^1$ represents a hydrogen atom or an alkyl group having 1 to 20 carbon atoms, L represents an ester bond, an ether bond, a phenylene group, or an amide bond, $R^2$ and $R^4$ each independently represent a hydrogen atom, a halogen atom, an alkyl group having 1 to 20 carbon atoms, or a halogenated alkyl group having 1 to 20 carbon atoms, and $R^3$ represents a hydrogen atom or a substituent.

<2> The film forming composition described in <1>, in which the polymer further has a repeating unit represented by General Formula (II).

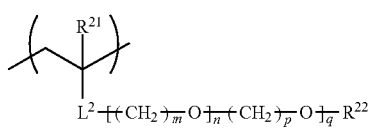

(II)

In General Formula (II), $R^{21}$ represents a hydrogen atom or an alkyl group having 1 to 20 carbon atoms, $R^{22}$ represents a hydrogen atom, an alkyl group having 1 to 20 carbon atoms, or an aryl group having 6 to 12 carbon atoms, $L^2$ represents an ester bond, an ether bond, a phenylene group, or an amide bond, m and p each independently represent an integer of 1 to 4, n represents a number of 1 to 30, and q represents a number of 0 to 30.

<3> The film forming composition described in <1> or <2>, in which a content rate of fluorine atoms in the polymer with respect to a total mass of the polymer is equal to or higher than 5% by mass and equal to or lower than 80% by mass.

<4> The film forming composition described in any one of <1> to <3>, in which in the polymer, a content rate of the repeating unit represented by General Formula (I) with respect to the total mass of the polymer is 3% to 100% by mass.

<5> A hardcoat film comprising a film formed of the film forming composition described in any one of <1> to <4>.

<6> A polarizing plate comprising the hardcoat film described in <5>.

<7> A method for manufacturing a hydrophilized hardcoat film, comprising a step of forming a hardcoat film by coating a support with the film forming composition described in any one of <1> to <4>, and a step of performing an alkali treatment on the hardcoat film.

According to the present invention, it is possible to provide a film forming composition, which makes it possible to form a film having excellent surface condition uniformity and being able to be improved in terms of lamination properties with respect to other layers by a simple treatment, a hardcoat film having a film formed of the composition, a polarizing plate, and a method for manufacturing a hydrophilized hardcoat film which has excellent surface condition uniformity and exhibits excellent lamination properties with respect to other layers.

DESCRIPTION OF THE PREFERRED EMBODIMENTS

Hereinafter, the present invention will be specifically described.

In the present specification, "to" means that the numerical values listed before and after "to" are a lower limit and an upper limit respectively.

In the present specification, "(meth)acrylate" means "at least one of acrylate and methacrylate". The same is true for (meth)acrylic acid, (meth)acrylamide, a (meth)acryloyl group, and the like.

<Film Forming Composition>

The film forming composition of the present invention contains a polymer having a repeating unit represented by General Formula (I) and a curable compound.

[Polymer having Repeating Unit Represented by General Formula (I)]

The polymer having a repeating unit represented by General Formula (I) (hereinafter, referred to as "fluorine-containing polymer" as well) will be described.

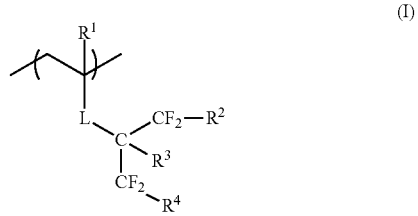

(I)

In General Formula (I), $R^1$ represents a hydrogen atom or an alkyl group having 1 to 20 carbon atoms, L represents an ester bond, an ether bond, a phenylene group, or an amide bond, $R^2$ and $R^4$ each independently represent a hydrogen atom, a halogen atom, an alkyl group having 1 to 20 carbon atoms, or a halogenated alkyl group having 1 to 20 carbon atoms, and $R^3$ represents a hydrogen atom or a substituent.

$R^1$ in General Formula (I) represents a hydrogen atom or an alkyl group having 1 to 20 carbon atoms, preferably represents a hydrogen atom or an alkyl group having 1 to 6 carbon atoms, more preferably represents a hydrogen atom or a methyl group, and particularly preferably represents a hydrogen atom.

$R^2$ and $R^4$ in General Formula (I) each independently represent a hydrogen atom, a halogen atom, an alkyl group having 1 to 20 carbon atoms, or a halogenated alkyl group having 1 to 20 carbon atoms. "Halogenated alkyl group" includes a halogenated alkyl group obtained in a case where some of the hydrogen atoms in an alkyl group are substituted with a halogen atom, and a perhaloalkyl group obtained in a case where all of the hydrogen atoms in an alkyl group are substituted with a halogen atom.

$R^2$ and $R^4$ in General Formula (I) each independently preferably represent a hydrogen atom, a halogen atom, or a halogenated alkyl group having 1 to 20 carbon atoms, more preferably represent a hydrogen atom, a halogen atom, or a perhaloalkyl group having 1 to 20 carbon atoms, even more preferably represent a hydrogen atom, a fluorine atom, or a perfluoroalkyl group, particularly preferably represent a hydrogen atom or a fluorine atom, and most preferably represent a fluorine atom.

$R^2$ and $R^4$ may further have a substituent. Examples of the substituent include a hydroxyl group, a halogen atom, a carboxyl group, and an amino group. Among these, a hydroxyl group or a halogen atom is preferable.

$R^3$ in General Formula (I) represents a hydrogen atom or a substituent.

In a case where $R^3$ represents a substituent, examples of the substituent include a halogen atom, an alkyl group, an alkenyl group (preferably an alkenyl group having 2 to 6 carbon atoms), an aryl group (preferably a phenyl group), a hydroxyl group, a carboxyl group, and a group obtained by combining these.

$R^3$ preferably represents a hydrogen atom, a halogen atom, or an alkyl group having 1 to 20 carbon atoms, more preferably represents a hydrogen atom, a fluorine atom, or an alkyl group having 1 to 6 carbon atoms, particularly preferably represents a hydrogen atom or a fluorine atom, and most preferably represents a hydrogen atom.

L in General Formula (I) represents an ester bond (—COO—), an ether bond (—O—), a phenylene group, or an amide bond (—CONH—), preferably represents an ester bond, a phenylene group, or an amide bond, and more preferably represents an ester bond from the viewpoint of the change to a hydrophilic surface by an alkali treatment.

For the purpose of controlling the solubility or the responsiveness to the environment at the time of alkali treatment, it is preferable that the fluorine-containing polymer contained in the film forming composition of the present invention further contains a repeating unit represented by General Formula (II) shown below.

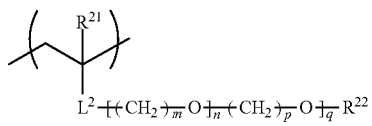

(II)

In General Formula (II), $R^{21}$ represents a hydrogen atom or an alkyl group having 1 to 20 carbon atoms, $R^{22}$ represents a hydrogen atom, an alkyl group having 1 to 20 carbon atoms, or an aryl group having 6 to 12 carbon atoms, $L^2$ represents an ester bond, an ether bond, a phenylene group, or an amide bond, m and p each independently represent an integer of 1 to 4, n represents a number of 1 to 30, and q represents a number of 0 to 30.

$R^{21}$ in General Formula (II) represents a hydrogen atom or an alkyl group having 1 to 20 carbon atoms, preferably represents a hydrogen atom or an alkyl group having 1 to 6 carbon atoms, and more preferably represents a hydrogen atom or a methyl group.

$R^{22}$ in General Formula (II) represents a hydrogen atom, an alkyl group having 1 to 20 carbon atoms, or an aryl group having 6 to 12 carbon atoms, preferably represents a hydrogen atom, an alkyl group having 1 to 6 carbon atoms, or a phenyl group, more preferably represents a hydrogen atom or an alkyl group having 1 to 6 carbon atoms, and particularly preferably represents a hydrogen atom or a methyl group.

$R^{22}$ may further have a substituent. Examples of the substituent include a hydroxyl group, a halogen atom, an amino group, and a carboxyl group. Among these, a hydroxyl group is preferable.

$L^2$ in General Formula (II) represents an ester bond, an ether bond, a phenylene group, or an amide bond, preferably represents an ester bond or an amide bond, and more preferably represents an ester bond from the viewpoint of the change to a hydrophilic surface by an alkali treatment.

m and p in General Formula (II) each independently represent an integer of 1 to 4, preferably represent an integer of 1 to 3, more preferably represent 2 or 3, and particularly preferably represent 2.

n in General Formula (II) represents a number of 1 to 30, preferably represents a number of 1 to 28, more preferably represents a number of 1 to 25, and particularly preferably represents a number of 2 to 23.

q in General Formula (II) represents a number of 0 to 30, preferably represents a number of 0 to 25, more preferably represents a number of 0 to 20, and particularly preferably represents a number of 0 to 15.

The sum of n and q preferably equals 1 to 30, and more preferably equals 1 to 25.

The fluorine-containing polymer contained in the film forming composition of the present invention may have other repeating units in addition to the aforementioned repeating unit. The aforementioned other repeating units are not particularly limited, and examples thereof include a repeating unit derived from a fluorine-containing monomer, a repeating unit derived from a (meth)acrylate-based monomer, a repeating unit derived from a (meth)acrylamide-based monomer, and a repeating unit derived from a styrene-based monomer.

In the present invention, by additionally introducing another repeating unit derived from a fluorine-containing monomer into the polymer having the repeating unit represented by General Formula (I), the surface tension can be controlled. As the repeating unit derived from a fluorine-containing monomer, a repeating unit represented by General Formula (III) shown below is preferable.

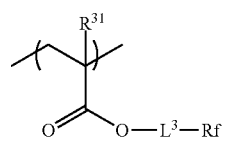

(III)

In General Formula (III), $R^{31}$ represents a hydrogen atom or an alkyl group having 1 to 20 carbon atoms, $L^3$ represents an alkylene group, and Rf represents a fluoroalkyl group.

$R^{31}$ in General Formula (III) represents a hydrogen atom or an alkyl group having 1 to 20 carbon atoms, preferably represents a hydrogen atom or an alkyl group having 1 to 6 carbon atoms, more preferably represents a hydrogen atom or a methyl group, and particularly preferably represents a hydrogen atom.

$L^3$ in General Formula (III) represents an alkylene group, preferably represents an alkylene group having 1 to 10 carbon atoms, more preferably represents an alkylene group having 1 to 6 carbon atoms, and particularly preferably represents an alkylene group having 1 to 3 carbon atoms.

Rf in General Formula (III) represents a fluoroalkyl group, preferably represents a fluoroalkyl group having 1 to 15 carbon atoms, and more preferably represents a fluoroalkyl group having 1 to 10 carbon atoms.

The fluorine-containing polymer may also contain a repeating unit derived from any (meth)acrylate-based monomer. Examples of the (meth)acrylate-based monomer include methyl acrylate, ethyl acrylate, 2-hydroxyethyl acrylate, 2,3-dihydroxypropyl acrylate, butyl acrylate, acrylamide, and the like.

In the fluorine-containing polymer, the content rate of the repeating unit represented by General Formula (I) shown above is not particularly limited, but is preferably 3% to 100% by mass with respect to the total mass of the fluorine-containing polymer. From the viewpoint of the solubility in a solvent at the time of synthesis and the hydrophilicity after the alkali treatment, the content rate of the repeating unit represented by General Formula (I) is more preferably 20% to 98% by mass, even more preferably 30% to 97% by mass, and still more preferably 40% to 96% by mass.

In a case where the fluorine-containing polymer contains the repeating unit represented by General Formula (II) shown above, from the viewpoint of the change to a hydrophilic surface by the alkali treatment and the viscosity of the polymer, the content rate of the repeating unit represented by General Formula (II) in the fluorine-containing polymer is preferably 1% to 85% by mass, more preferably 3% to 60% by mass, and even more preferably 5% to 40% by mass, with respect to the total mass of the fluorine-containing polymer.

In a case where the fluorine-containing polymer contains the repeating unit represented by General Formula (III) shown above, from the viewpoint of the solubility in a solvent at the time of synthesis and the water contact angle after the alkali treatment, the content rate of the repeating unit represented by General Formula (III) in the fluorine-containing polymer is preferably 1% to 95% by mass, more preferably 5% to 80% by mass, and even more preferably 5% to 60% by mass, with respect to the total mass of the fluorine-containing polymer.

From the viewpoint of the solubility in a solvent at the time of synthesis and the surface condition uniformity, the weight-average molecular weight (Mw) of the fluorine-containing polymer is preferably 800 to 50,000, more preferably 1,000 to 50,000, even more preferably 1,500 to 40,000, and particularly preferably 2,000 to 30,000. In a case where the molecular weight is less than 800, the action of causing the polymer to be precipitated mainly on the surface does not sufficiently occur, and the surface condition uniformity of the coating film deteriorates. In a case where the molecular weight is equal to or greater than 50,000, the polymer does not dissolve in a solvent at the time of synthesizing the polymer, and a problem such as precipitation may occur.

The weight-average molecular weight and the number-average molecular weight of the fluorine-containing polymer are values measured by gel permeation chromatography (GPC) under the following conditions.
[Eluent] tetrahydrofuran (THF)
[Device name] EcoSEC HLC-8320GPC (manufactured by Tosoh Corporation)
[Column] TSKgel SuperHZM-H, TSKgel SuperHZ4000, TSKgel SuperHZ200 (manufactured by Tosoh Corporation)
[Column temperature] 40° C.
[Flow rate] 0.35 ml/min From the viewpoint of the solubility in a solvent at the time of synthesis, the content rate of fluorine atoms (fluorine content) in the fluorine-containing polymer is preferably 5% to 80% by mass, more preferably 10% to 65% by mass, and even more preferably 20% to 55% by mass.

The fluorine content is a ratio of the mass of fluorine atoms contained in the fluorine-containing polymer to the total mass of the fluorine-containing polymer.

The fluorine-containing polymer can be synthesized by known methods.

In a case where the fluorine-containing polymer contains two or more kinds of repeating units, the fluorine-containing polymer may be a random copolymer or a block copolymer.

Specific examples of the fluorine-containing polymer will be shown below, but the present invention is not limited thereto. In the specific examples shown below, the content of each of the repeating units is a ratio of the mass (% by mass) of each of the repeating units to the total mass of the fluorine-containing polymer.

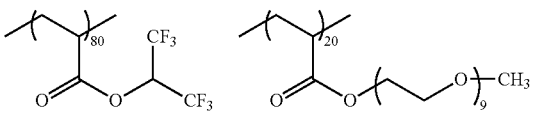

B-1

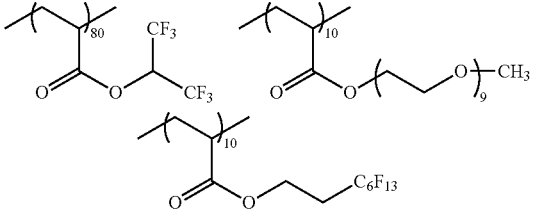

B-2

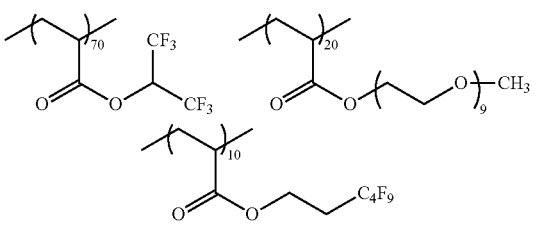

B-3

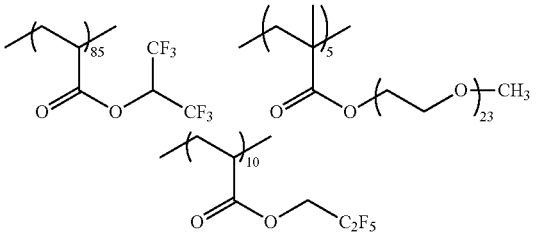

B-4

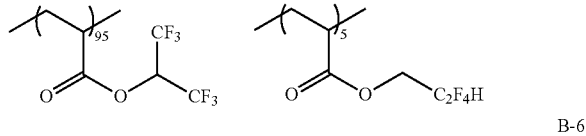

B-5

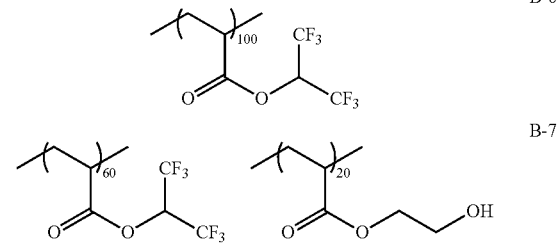

B-6

B-7

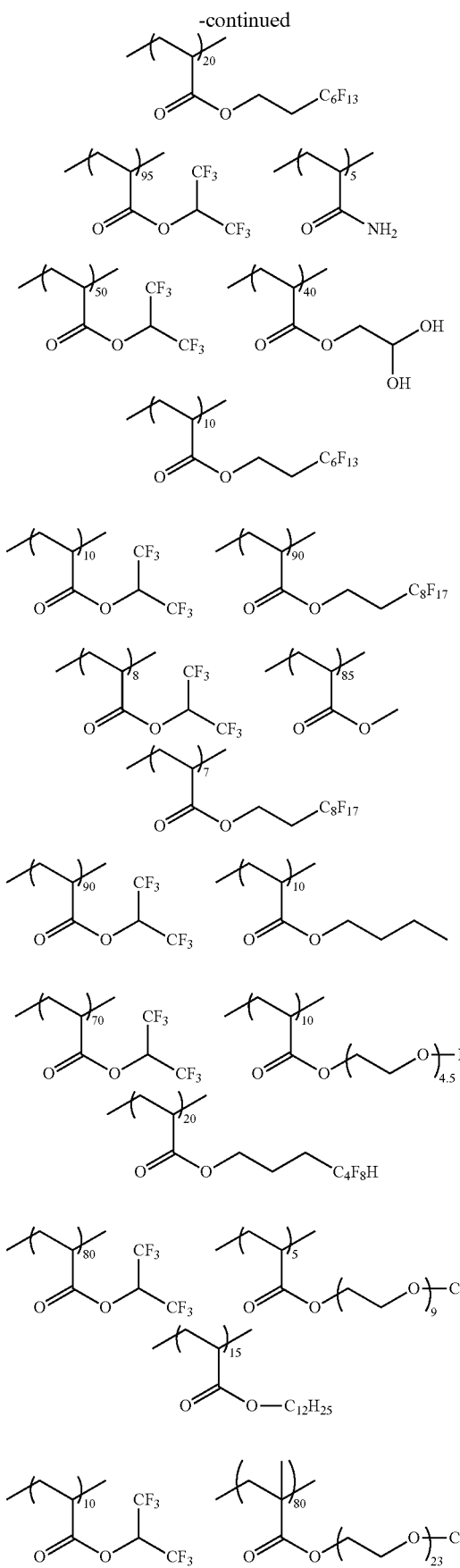

-continued

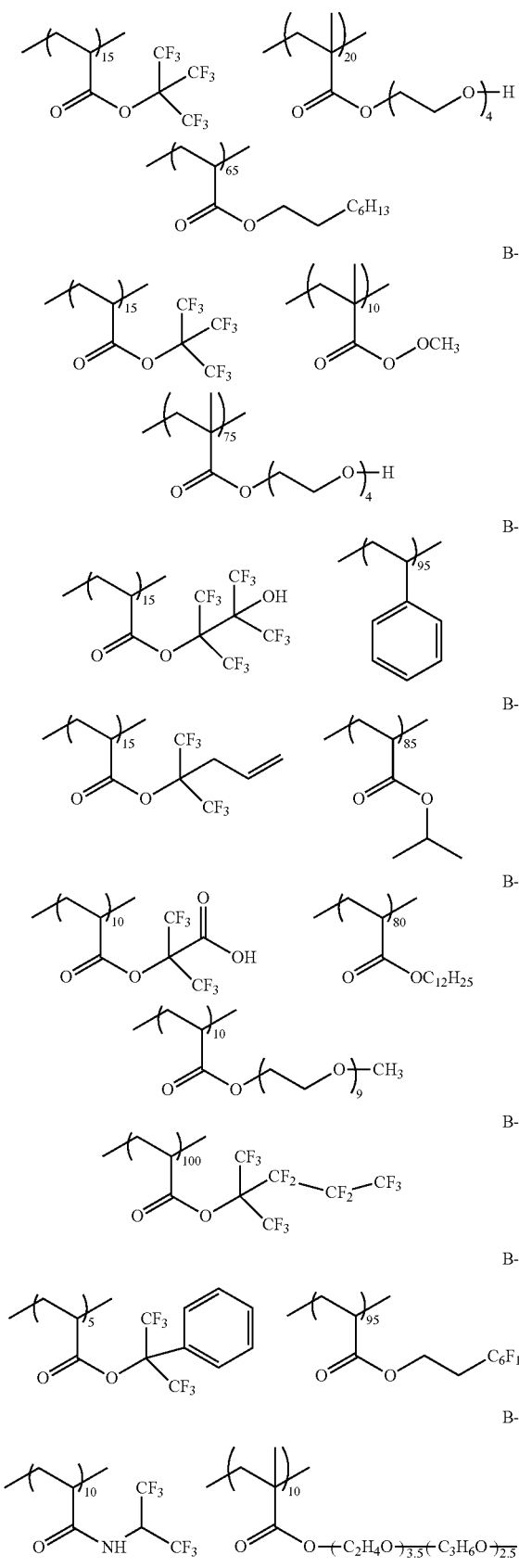

From the viewpoint of achieving both the surface condition uniformity of the film and the lamination properties with respect to other layers, provided that the total solid content of the film forming composition (all components except for a solvent) is 100% by mass, the content of the polymer having the repeating unit represented by General Formula (I) shown above in the film forming composition of the present invention is preferably 0.01% to 1% by mass, more preferably 0.03% to 0.5% by mass, and even more preferably 0.05% to 0.3% by mass.

[Curable Compound]

The film forming composition of the present invention contains a curable compound.

The curable compound is not particularly limited as long as it is a compound which causes a reaction by the application of a certain kind of energy and is cured. The curable compound is particularly preferably a compound which is cured by heat, ultraviolet rays (UV), or radiation. In a case where the film forming composition of the present invention contains such a curable compound, the composition can be suitably used as a composition for forming a hardcoat layer.

The film forming composition of the present invention may contain only one kind of curable compound or two or more kinds of curable compounds.

Provided that the total solid content (all components except for a solvent) of the film forming composition is 100% by mass, the content of the curable compound in the film forming composition of the present invention is preferably 40% to 90% by mass, more preferably 45% to 85% by mass, and even more preferably 50% to 80% by mass.

As the curable compound, a compound is preferable which has at least either an ethylenically unsaturated double bond group or an epoxy group in a molecule. Examples of compounds preferred as the curable compound include (b) compound having three or more ethylenically unsaturated double bond groups in a molecule and (c) compound having one or more epoxy groups in a molecule described below.

<<(b) Compound Having Three or More Ethylenically Unsaturated Double Bond Groups in Molecule>>

It is preferable that the film forming composition of the present invention contains, as the curable compound, (b) compound (referred to as "compound (b)" as well) having three or more ethylenically unsaturated double bond groups in a molecule.

Examples of the ethylenically unsaturated double bond group include polymerizable functional groups such as a (meth)acryloyl group, a vinyl group, a styryl group, and an allyl group. Among these, a (meth)acryloyl group and —C(O)OCH=CH$_2$ are preferable, and a (meth)acryloyl group is particularly preferable. In a case where the curable compound has three or more ethylenically unsaturated double bond groups, high hardness can be maintained, and moisture-heat resistance can be imparted.

Examples of the compound (b) include an ester of a polyhydric alcohol and (meth)acrylic acid, vinyl benzene and a derivative thereof, a vinyl sulfone, (meth)acrylamide, and the like. Among these, from the viewpoint of the hardness, a compound having three or more (meth)acryloyl groups is preferable, and examples thereof include (meth)acrylate-based compounds which are widely used in the field of the related art to form a cured substance having high hardness. Examples of the compound (b) include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexanetetramethacrylate, polyurethane polyacrylate, polyester polyacrylate, caprolactone-modified tris(acryloxyethyl)isocyanurate, and the like.

The film forming composition of the present invention may contain, as the compound (b), only one kind of compound or two or more kinds of compounds.

Provided that the total solid content (all components except for a solvent) of the film forming composition of the present invention is 100% by mass, the content of the compound (b) is preferably 40% to 80% by mass, more preferably 45% to 75% by mass, and even more preferably 50% to 70% by mass. In a case where the content of the compound (b) is equal to or greater than 40% by mass, sufficient hardness can be obtained.

An ethylenically unsaturated bond group equivalent of the compound (b) is preferably 80 to 130. The ethylenically unsaturated bond group equivalent is a value obtained by dividing the molecular weight of the compound (b) by the number of ethylenically unsaturated groups.

The ethylenically unsaturated bond group equivalent of the compound (b) is more preferably 80 to 110, and even more preferably 80 to 100.

<<(c) Compound Having One or More Epoxy Groups in Molecule>>

It is also preferable that the film forming composition of the present invention contains, as the curable compound, (c) compound (referred to as "compound (c)" as well) having one or more epoxy groups in a molecule.

The number of epoxy groups in the compound (c) is not particularly limited as long as it is equal to or greater than 1.

The molecular weight of the compound (c) is preferably equal to or smaller than 300, more preferably equal to or smaller than 250, and even more preferably equal to or smaller than 200. From the viewpoint of inhibiting the volatilization at the time of forming a film, the molecular weight of the compound (c) is preferably equal to or greater than 100 and more preferably equal to or greater than 150.

It is more preferable that the compound (c) is a compound which has one alicyclic epoxy group and one ethylenically unsaturated double bond group in one molecule and has a molecular weight equal to or smaller than 300. In a case where the epoxy group is alicyclic, and the molecular weight is equal to or smaller than 300, the deterioration of hardness can be more effectively prevented.

The ethylenically unsaturated double bond group that the compound (c) can have is not particularly limited, and examples thereof include a (meth)acryloyl group, a vinyl group, a styryl group, an allyl group, and the like. Among these, a (meth)acryloyl group and —C(O)OCH=CH$_2$ are preferable, and a (meth)acryloyl group is particularly preferable.

Provided that the compound (c) has ethylenically unsaturated double bond groups, in a case where the compound (b) is used in combination with the compound (c), the compound (c) obtains a binding force acting on the compound (b). Therefore, it is possible to prevent the deterioration of hardness and to inhibit bleed out that occurs when the film is left to endure a moisture and heat.

Provided that the total solid content of the film forming composition of the present invention is 100% by mass, the content of the compound (c) is preferably 10% to 40% by mass, more preferably 12% to 35% by mass, and even more preferably 15% to 25% by mass. In a case where the content of the compound (c) is equal to or greater than 10% by mass, the smoothness is more effectively improved, and the surface conditions of the formed film become excellent. In a case where the content is equal to or smaller than 40% by mass, the hardness is improved.

As specific examples of the compound (c), those having one or more alicyclic epoxy groups in one molecule are preferable, and bicyclohexyl diepoxide; 3,4,3',4'-diepoxybicyclohexyl, butanetetracarboxylic acid tetra(3,4-epoxycyclohexylmethyl) modified ε-caprolactone, the compound descried in paragraph "0015" in JP1998-17614A (JP-H10-17614A) or represented by General Formula (1A) or (1B) shown below, 1,2-epoxy-4-vinyl cyclohexane, and the like can be used. Among these, a compound represented by General Formula (1A) or (1B) shown below is more preferable, and a compound represented by General Formula (1A) shown below that has a low molecular weight is even more preferable. Furthermore, an isomer of the compound represented by General Formula (1A) or (1B) shown below is also preferable. In a case where these compounds are used, the smoothness of the film is improved, and high hardness can be maintained.

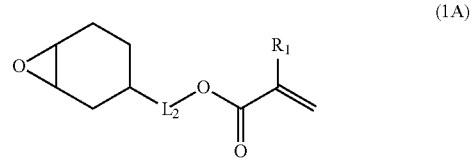

(1A)

In General Formula (1A), R$_1$ represents a hydrogen atom or a methyl group, and L$_2$ represents a divalent aliphatic hydrocarbon group having 1 to 6 carbon atoms.

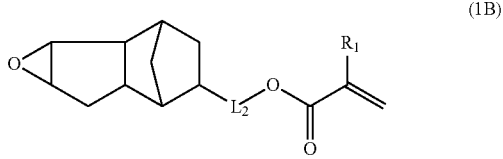

(1B)

In General Formula (1B), $R_1$ represents a hydrogen atom or a methyl group, and $L_2$ represents a divalent aliphatic hydrocarbon group having 1 to 6 carbon atoms.

The number of carbon atoms in the divalent aliphatic hydrocarbon group represented by $L_2$ in General Formulae (1A) and (1B) is 1 to 6, more preferably 1 to 3, and even more preferably 1. The divalent aliphatic hydrocarbon group is preferably a linear, branched, or cyclic alkylene group, more preferably a linear or branched alkylene group, and even more preferably a linear alkylene group.

The film forming composition of the present invention may contain other components in addition to the fluorine-containing polymer and the curable compound described above. Examples of the aforementioned other components include inorganic fine particles, an ultraviolet absorber, a solvent, a polymerization initiator, an air blow unevenness inhibitor, and the like.

<<Inorganic Fine Particles>>

Examples of the inorganic fine particles include silica particles, titanium dioxide particles, zirconium oxide particles, aluminum oxide particles, and the like. Among these, silica particles are preferable. The inorganic fine particles may have undergone a surface treatment.

((d) Inorganic Fine Particles Reactive to Epoxy Group or Ethylenically Unsaturated Double Bond Group)

As the inorganic fine particles, (d) inorganic fine particles (referred to as "inorganic fine particles (d)" as well) reactive to an epoxy group or an ethylenically unsaturated double bond group are preferable.

In a case where the film forming composition of the present invention contains the inorganic fine particles (d), the hydrophilicity of the obtained film can be improved. Furthermore, a cure shrinkage amount of the obtained film can be reduced, and accordingly, curling can be reduced. In addition, because the inorganic fine particles (d) are reactive to an epoxy group or an ethylenically unsaturated double bond group, the pencil hardness of the film can be improved.

The average primary particle diameter of the inorganic fine particles (d) is preferably 10 nm to 100 nm, and more preferably 10 to 60 nm. The average particle diameter of the fine particles can be determined from an electron micrograph.

The shape of the inorganic fine particles (d) may be spherical or nonspherical. From the viewpoint of imparting hardness, nonspherical particles in which two to ten inorganic fine particles are linked to each other are preferable. Presumably, in a case where inorganic fine particles in which several particles are linearly linked to each other are used, a strong particle network structure may be formed, and the hardness may be improved.

Provided that the total solid content of the film forming composition is 100% by mass, the content of the inorganic fine particles (d) is preferably 10% to 40% by mass, more preferably 15% to 30% by mass, and even more preferably 15% to 25% by mass.

<<Ultraviolet Absorber>>

It is preferable that the film forming composition of the present invention contains an ultraviolet absorber.

The film formed of the film forming composition of the present invention can be used, for example, in a polarizing plate, a member for a liquid crystal display, or the like. From the viewpoint of preventing the deterioration of the polarizing plate, the liquid crystal, and the like, an ultraviolet absorber is preferably used. As the ultraviolet absorber, those hardly absorbing visible light of a wavelength of equal to or longer than 400 nm are preferably used, because such ultraviolet absorbers can excellently absorb ultraviolet rays of a wavelength of equal to or shorter than 370 nm and result in excellent liquid crystal display properties. One kind of ultraviolet absorber may be used singly, or two or more kinds of ultraviolet absorbers may be used in combination. Examples thereof include the ultraviolet absorbers described in JP2001-72782A or JP2002-543265A. Specific examples of the ultraviolet absorber include an oxybenzophenone-based compound, a benzotriazole-based compound, a salicylic acid ester-based compound, a benzophenone-based compound, a cyanoacrylate-based compound, a nickel complex salt-based compound, and the like.

<<Solvent>>

It is preferable that the film forming composition of the present invention contains a solvent. As the solvent, considering the solubility of the curable compound, the dispersibility of the inorganic fine particles, the drying properties at the time of coating, and the like, an appropriate type of solvent can be selected and used. As the solvent, organic solvents are preferable, and examples thereof include an alcohol-based solvent, an ether-based solvent, a ketone-based solvent, an ester-based solvent, a carbonate-based solvent, a hydrocarbon-based solvent, and the like.

The concentration of the solid content of the film forming composition of the present invention is preferably 20% to 80% by mass, more preferably 30% to 75% by mass, and particularly preferably 40% to 70% by mass.

<<Polymerization Initiator>>

It is preferable that the film forming composition of the present invention contains a polymerization initiator.

The polymerization initiator is not particularly limited, and examples thereof include a radical polymerization initiator, a cationic polymerization initiator, and the like.

The radical polymerization initiator is not particularly limited, and examples thereof include an alkylphenone-based photopolymerization initiator, an acylphosphine oxide-based photopolymerization initiator, and the like.

The cationic polymerization initiator is not particularly limited, and examples thereof include an onium compound, an organic halogen compound, a disulfone compound, and the like.

Provided that the total solid content of the film forming composition of the present invention is 100% by mass, the content of the polymerization initiator is preferably within a range of 0.1% to 10% by mass, more preferably 1% to 5% by mass, and even more preferably 2% to 4% by mass.

<<Air Blow Unevenness Inhibitor>>

As long as the effects of the present invention can be exerted, the film forming composition of the present invention may contain an air blow unevenness inhibitor in addition to the aforementioned fluorine-containing polymer.

Examples of the air blow unevenness inhibitor include known fluorine-based surfactants and silicone-based surfactants.

[Optical Film]

An optical film having a film formed of the film forming composition of the present invention will be described.

It is preferable that the optical film has a constitution in which the film formed of the film forming composition of the present invention is on a support.

(Support)

As the support, a transparent support having an average visible light (wavelength of 400 to 800 nm) transmittance of equal to or higher than 80% is preferable, and glass or a polymer film can be used. Examples of materials of polymer films used as the support include cellulose acylate (for example, cellulose triacetate, cellulose diacetate, cellulose acetate butyrate, and cellulose acetate propionate), polyolefin such as polyethylene and polypropylene, polyester such as polyethylene terephthalate and polyethylene naphthalate, polyacrylate such as polyether sulfone and polymethyl methacrylate, polyurethane, polycarbonate, polysulfone, polyether, polymethyl pentene, polyether ketone, (meth)acrylnitrile, a polymer having an alicyclic structure (norbornene-based resin (for example, ARTON: trade name, manufactured by JSR Corporation), amorphous polyolefin (for example, ZEONEX: trade name, manufactured by ZEON CORPORATION)), and the like.

As the support of the optical film of the present invention, a cellulose acylate film is preferable.

The support may be a temporary support that is peeled off after a film is formed using the film forming composition.

The film thickness of the support may be about 1 μm to 1,000 μm. The support can also be made into a thin layer appropriate for mobile use. Therefore, the film thickness of the support is more preferably 1 μm to 100 μm and even more preferably 1 μm to 25 μm.

[Hardcoat Film]

The hardcoat film of the present invention is one of the preferred forms of the optical film, and includes the film formed of the film forming composition of the present invention as a hardcoat layer. For example, in a case where (b) compound having three or more ethylenically unsaturated double bond groups in a molecule described above is used as the curable compound contained in the film forming composition of the present invention, a hardcoat layer can be obtained.

Generally, as the simplest constitution of the hardcoat film of the present invention, a constitution is adopted in which a support is coated with the film forming composition of the present invention so as to form a hardcoat layer.

The hardcoat film of the present invention may have other layers in addition to the hardcoat layer. Examples of aforementioned other layers include a layer of low refractive index, an antiglare layer, an antistatic layer, a layer of high refractive index, a layer of middle refractive index, and the like.

By treating the hardcoat film of the present invention with an aqueous alkali solution (alkali treatment), the hydrophilicity of the surface of the hardcoat layer can be improved. Therefore, other layers are easily laminated on the hardcoat layer.

In a case where the film formed of the film forming composition of the present invention is used as a lower layer, and another layer (upper layer) is formed on the surface of the film by means of film formation by coating, as a solvent of a coating solution for forming the upper layer, a wide variety of solvents can be used.

The hardcoat film of the present invention can be used as a polarizing plate protective film. In a case where the hardcoat film is used as a polarizing plate protective film, the method for preparing a polarizing plate is not particularly limited, and the polarizing plate can be prepared by a general method. For example, it is possible to use a method of treating the hardcoat film with an alkali, immersing and stretching a polyvinyl alcohol film in an iodine solution so as to prepare a polarizer, and bonding the hardcoat film to both surfaces of the polarizer by using an aqueous solution of completely saponified polyvinyl alcohol.

The film thickness of the film formed of the film forming composition of the present invention can be selected according to the intended hardness, and is preferably 1 to 50 μm.

In a case where the hardcoat film of the present invention is used as a polarizing plate protective film, the thickness of the hardcoat layer is preferably 3 to 10 μm.

(Coating Method)

The method for coating a support with the film forming composition of the present invention is not particularly limited, and known methods such as a dip coating method, an air knife coating method, a curtain coating method, a roller coating method, a wire bar coating method, a gravure coating method, a slide coating method, an extrusion coating method (die coating method) (see JP2003-164788A), and a microgravure coating method are used. Among these, a microgravure coating method and a die coating method are preferable.

(Drying and Curing Conditions)

By coating a support with the film forming composition of the present invention and then drying and curing the composition, a film can be formed.

In the present invention, it is effective to cure the composition by combining the irradiation of ionizing radiation with a heat treatment which is performed before the irradiation, simultaneously with the irradiation, or after the irradiation.

Furthermore, a step of performing a heat treatment simultaneously with the curing by the irradiation of ionizing radiation is also preferable.

In the present invention, it is preferable to perform the heat treatment in combination with the irradiation of ionizing radiation as described above. The heat treatment is not particularly limited as long as the layer constitution including the support of the hardcoat film and the hardcoat layer is not damaged. The heat treatment is performed preferably at a temperature of 40° C. to 150° C. and more preferably at a temperature of 40° C. to 80° C.

The time required for the heat treatment varies with the molecular weight of the used component, the interaction with other components, the viscosity, and the like, but is 15 seconds to 1 hour, preferably 20 seconds to 30 minutes, and most preferably 30 seconds to 5 minutes.

The type of the ionizing radiation is not particularly limited, and examples thereof include X-rays, electron beams, ultraviolet rays, visible light, infrared rays, and the like. Among these, ultraviolet rays are preferably used. For example, in a case where the coating film can be cured by ultraviolet rays, it is preferable to cure each layer by irradiating the layer with ultraviolet rays from an ultraviolet lamp in an irradiation amount of 10 mJ/cm$^2$ to 1,000 mJ/cm$^2$. At the time of irradiation, the aforementioned energy may be applied at once, or each layer can be irradiated with the energy in divided portions.

[Polarizing Plate]

The polarizing plate of the present invention has the hardcoat film of the present invention. It is preferable that the polarizing plate has at least one sheet of hardcoat film of the present invention as a polarizing plate protective film. Furthermore, it is preferable that a hydrophilized hardcoat film, which has undergone the alkali treatment, and a polarizer are bonded to each other.

Examples of adhesives used for bonding the hydrophilized hardcoat film having undergone the alkali treatment and the polarizer to each other include a polyvinyl alcohol-based adhesive such as polyvinyl alcohol and polyvinyl butyral, vinyl-based latex such as butyl acrylate, and the like.

[Method for Manufacturing Hydrophilized Hardcoat Film]

The present invention also relates to a method for manufacturing a hydrophilized hardcoat film, including a step of forming a hardcoat film by coating a support with the film forming composition of the present invention and a step of performing an alkali treatment on the hardcoat film.

Examples of the method for performing an alkali treatment on the hardcoat film include a method of immersing the hardcoat film in an aqueous alkali solution and the like.

In the present invention, "hydrophilized" means that the affinity of the surface of the hardcoat film with water becomes higher after the alkali treatment than before the alkali treatment but is not as high as a level of affinity at which the hardcoat film dissolves in water. Specifically, the water contact angle of the surface of the hydrophilized hardcoat film is preferably equal to or smaller than 75°, more preferably equal to or smaller than 60°, and particularly preferably equal to or smaller than 50°.

(Alkali Treatment)

The aqueous alkali solution used in the alkali treatment is not particularly limited, and examples thereof include an aqueous sodium hydroxide (NaOH) solution and the like.

The alkali treatment is the same as the saponification treatment that is generally performed in a case where a cellulose acylate film is bonded to a polarizer.

EXAMPLES

Hereinafter, the present invention will be more specifically described based on examples. The amount and proportion of materials, reagents, and substances shown in the following examples, the operation shown in the following examples, and the like can be appropriately modified as long as the gist of the present invention is maintained. Accordingly, the scope of the present invention is not limited to the following examples.

Synthesis Example 1

(Synthesis of Polymer B-1)

10.0 g of methyl ethyl ketone was put into a 200 mL three-neck flask equipped with a stirrer, a thermometer, a reflux cooling pipe, and a nitrogen gas introduction pipe and heated to 78° C. Then, a mixed solution composed of 16.00 g (72 mmol) of hexafluoroisopropyl acrylate (HFIP), 4.00 g (8.3 mmol) of AME-400 (manufactured by NOF CORPORATION), 10.0 g of methyl ethyl ketone, and 5.34 g of "V-601" (manufactured by Wako Pure Chemical Industries, Ltd.) was added dropwise thereto at a constant speed until the mixed solution was completely added dropwise within 180 minutes. After the mixed solution was completely added dropwise, the obtained solution was continuously stirred for 5 hours, thereby obtaining 43.0 g of a methyl ethyl ketone solution of a polymer B-1. The weight-average molecular weight (Mw) of the polymer B-1 was 3,900 (measured by gel permeation chromatography (EcoSEC HLC-8320GPC (manufactured by Tosoh Corporation)) by using THF as an eluent under the measurement conditions of a flow rate of 0.35 ml/min and a temperature of 40° C. and expressed in terms of polystyrene, TSKgel SuperHZM-H, TSKgel SuperHZ4000, and TSKgel SuperHZ200 (manufactured by Tosoh Corporation) were used as columns). The structure of the obtained polymer was identified using a Nuclear Magnetic Resonance ($^1$H-NMR) spectrum, and the compositional ratio between repeating units contained in the polymer was determined.

Synthesis Examples 2 to 19

(Synthesis of Fluorine-Containing Copolymers B-1 to B-16)

Polymers B-2 to B-16 were synthesized in the same manner as in Synthesis Example 1, except that the type of the monomers and the ratio of the mass of each of the monomers to the total mass of the monomers (compositional ratio of monomers) were changed as shown in Table 1.

Synthesis Example 17

(Synthesis of Compound A)

According to the description in paragraph "0093" in JP2008-503469A, a compound A shown below was synthesized.

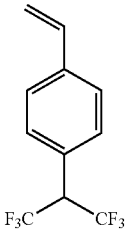

Compound A (Synthesis of Polymer B-17)

A polymer B-17 was synthesized in the same manner as in Synthesis Example 2, except that HFIP used in Synthesis Example 2 was changed to the above compound A.

Synthesis Example 18

(Synthesis of Compound B)

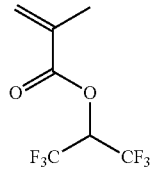

Compound B 11.6 g (68.9 mmol, manufactured by TOKYO CHEMICAL INDUSTRY CO., LTD.) of hexafluoroisopropyl alcohol and 50 mL of tetrahydrofuran were put into a 200 mL flask equipped with a stirring blade, a thermometer, a cooling pipe, and an ice bath and cooled down to 5° C. in the ice bath. 8.0 g (manufactured by TOKYO CHEMICAL INDUSTRY CO., LTD., 76.5 mmol) of methacrylic acid chloride was added dropwise thereto for 10 minutes, the flask was then heated such that the internal temperature became 25° C., and the mixture was stirred for 4 hours. The obtained compound was purified by column chromatography, thereby synthesizing a compound B. The amount of the collected compound B was 4.5 g (yield: 28%).

(Synthesis of Polymer B-18)

A polymer B-18 was synthesized in the same manner as in Synthesis Example 2, except that HFIP used in Synthesis Example 2 was changed to the above compound B, and AME-400 was changed to 50PEP-300.

Synthesis Example 19

(Synthesis of Compound C)

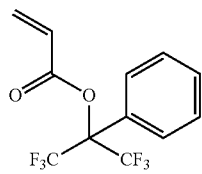

Compound C 19.4 g (79.5 mmol, manufactured by TOKYO CHEMICAL INDUSTRY CO., LTD.) of 1,1,1,3,3,3-hexafluoro-2-phenyl-2-propanol and 50 mL of tetrahydrofuran were put into a 200 mL flask equipped with a stirring blade, a thermometer, a cooling pipe, and an ice bath and cooled down to 5° C. in the ice bath. 8.0 g (manufactured by TOKYO CHEMICAL INDUSTRY CO., LTD., 88.4 mmol) of acrylic acid chloride was added dropwise thereto for 10 minutes, the flask was then heated such that the internal temperature became 25° C., and the mixture was stirred for 4 hours. The obtained compound was purified by column chromatography, thereby synthesizing a compound C. The amount of the collected compound C was 7.2 g (yield: 30%).

(Synthesis of Polymer B-19)

A polymer B-19 was synthesized in the same manner as in Synthesis Example 2, except that HFIP used in Synthesis Example 2 was changed to the above compound C, and FAAC-6 was changed to FAMAC-4.

Synthesis Examples 20 to 22

(Synthesis of Polymers C-1 to C-5)

Polymers C-1 to C-5 were synthesized in the same manner as in Synthesis Example 1, except that the type of monomers and the compositional ratio of the monomers were changed as shown in the following Table 1.

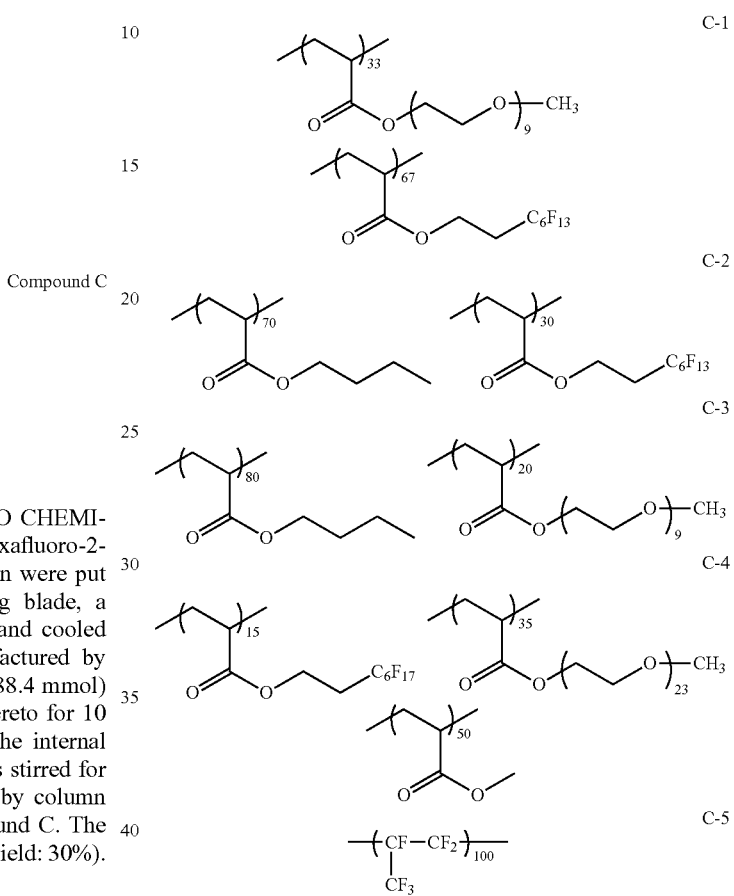

The fluorine content and the weight-average molecular weight (Mw) of each of the polymers are shown in the following Table 1.

TABLE 1

| Polymer | Type of monomer | | | Compositional ratio of monomers (% by mass) | | | Fluorine content % | Mw |
| --- | --- | --- | --- | --- | --- | --- | --- | --- |
| | 1 | 2 | 3 | 1 | 2 | 3 | | |
| B-1 | HFIP | AME-400 | — | 80 | 20 | — | 41.1 | 3900 |
| B-2 | HFIP | AME-400 | FAAC-6 | 80 | 10 | 10 | 47.0 | 4200 |
| B-3 | HFIP | AME-400 | C4F9 | 70 | 20 | 10 | 41.3 | 1900 |
| B-4 | HFIP | PME-1000 | C2F5 | 85 | 5 | 10 | 48.0 | 2200 |
| B-5 | HFIP | — | C2F4H | 95 | — | 5 | 50.8 | 1200 |
| B-6 | HFIP | — | — | 100 | — | — | 51.3 | 3900 |
| B-7 | HFIP | 2-Hydroxyethyl acrylate | FAAC-6 | 60 | 20 | 20 | 42.6 | 12200 |
| B-8 | HFIP | Acrylamide | — | 95 | 5 | — | 48.8 | 1800 |
| B-9 | HFIP | BLEMMER GLM | FAAC-6 | 50 | 40 | 10 | 31.6 | 5100 |
| B-10 | HFIP | C8H17 | — | 10 | 90 | — | 61.2 | 3300 |
| B-11 | HFIP | Methyl acrylate | C8F17 | 8 | 85 | 7 | 8.5 | 4300 |
| B-12 | HFIP | Butyl acrylate | — | 90 | 10 | — | 46.2 | 2500 |
| B-13 | HFIP | AE-200 | C4F8H | 70 | 10 | 20 | 46.6 | 38000 |
| B-14 | HFIP | AME-400 | Dodecyl acrylate | 80 | 5 | 15 | 41.1 | 900 |

TABLE 1-continued

| Polymer | Type of monomer 1 | Type of monomer 2 | Type of monomer 3 | Compositional ratio of monomers (% by mass) 1 | 2 | 3 | Fluorine content % | Mw |
|---|---|---|---|---|---|---|---|---|
| B-15 | HFIP | PME-1000 | C2F5 | 10 | 80 | 10 | 9.5 | 3600 |
| B-16 | HFIP | — | C2F4H | 5 | — | 95 | 41.4 | 4800 |
| B-17 | Compound A | AME-400 | FAAC-6 | 80 | 10 | 10 | 41.8 | 3200 |
| B-18 | Compound B | 50PEP-300 | FAAC-6 | 80 | 10 | 10 | 39.2 | 4100 |
| B-19 | Compound C | AME-400 | FAMAC-4 | 80 | 10 | 10 | 31.1 | 4800 |
| C-1 | — | AME-400 | FAAC-6 | — | 33 | 67 | 39.6 | 3500 |
| C-2 | t-Butyl acrylate | — | FAAC-6 | 70 | — | 30 | 17.7 | 2900 |
| C-3 | t-Butyl acrylate | AME-400 | — | 80 | 20 | — | 0.0 | 5600 |
| C-4 | C8H17 | PME-1000 | MMA | 15 | 35 | 50 | 9.3 | 15000 |
| C-5 | Hexafluoropropylene | — | — | 100 | — | — | 76.0 | 125000 |

The abbreviations in Table 1 mean the following.
C4F9: 2-(perfluorobutyl)ethyl acrylate
C2F5: 2,2,3,3,3-pentafluoropropyl acrylate
C2F4H: 2,2,3,3-tetrafluoropropyl acrylate
C8F17: 2-(perfluorooctyl)ethyl acrylate
C4F8H: 1H,1H,5H-octafluoropentyl acrylate
AME-400: BLEMMER AME-400 (manufactured by NOF CORPORATION)
PME-1000: BLEMMER PME-1000 (manufactured by NOF CORPORATION)
AE-200: BLEMMER AE-200 (manufactured by NOF CORPORATION)
BLEMMER GLM: BLEMMER GLM (manufactured by NOF CORPORATION)
FAAC-6: 2-(perfluorohexyl)ethyl acrylate (manufactured by UNIMATEC Co., LTD.)
MMA: methyl methacrylate
50PEP-300: polyethylene glycol-propylene glycol-monomethacrylate (manufactured by NOF CORPORATION)
FAMAC-4: (2-perfluorobutyl)ethyl methacrylate (manufactured by UNIMATEC Co., LTD.)

(Preparation of Hardcoat Layer Coating Solution A-1)

The components were mixed together so as to obtain the composition shown below, thereby preparing a hardcoat layer coating solution (film forming composition) A-1 having a concentration of solid contents of about 55% by mass.

| Composition of hardcoat layer coating solution A-1 | |
|---|---|
| Dipentaerythritol hexa acrylate (DPHA): KAYARAD DPHA (manufactured by Nippon Kayaku Co., Ltd.) (hexafunctional) | 29.6 parts by mass |
| IRGACURE 184: alkylphenone-based photopolymerization initiator (manufactured by BASF SE) | 2.20 parts by mass |
| 3,4-Epoxycyclohexylmethyl methacrylate: CYCLOMER M100 (manufactured by Daicel Corporation, molecular weight: 196) | 13.8 parts by mass |
| Compound 1 | 0.55 parts by mass |
| Polymer B-1 | 0.06 parts by mass |
| MEK-AC-2140Z (average particle diameter: 10 to 20 nm, spherical silica fine particles (manufactured by NISSAN CHEMICAL INDUSTRIES, LTD.)) | 8.25 parts by mass |
| Tinuvin 928: benzotriazole-based ultraviolet absorber (manufactured by BASF SE) | 0.55 parts by mass |
| Methyl ethyl ketone | 16.7 parts by mass |
| Methyl isobutyl ketone | 19.8 parts by mass |
| Methyl acetate: | 8.5 parts by mass |

The compound 1 was synthesized by the method described in Example 1 in JP4841935B.

Compound 1

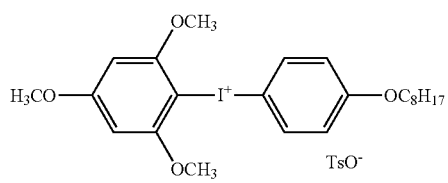

<Preparation of Hardcoat Layer Coating Solutions A-2 to A-24>

Hardcoat layer coating solutions A-2 to A-24 were prepared in the same manner as that used for preparing the aforementioned hardcoat layer coating solution A-1, except that the polymer B-1 was changed to the polymers described in the following Table 2.

<Coating for Hardcoat Layer>

TJ25 (manufactured by FUJIFILM Corporation, roll form, triacetyl cellulose film having a thickness of 80 μm) unrolled from a roll form was used as a support, and the support was coated with each of the hardcoat layer coating solutions A-1 to A-24, thereby preparing hardcoat films S-1 to S-24.

Specifically, by a die coating method, the support was coated with each of the coating solutions under the condition of a transport speed of 30 m/min by using a slot die described in Example 1 in JP2006-122889A, thereby obtaining a coating layer. The coating layer was dried for 150 seconds at 60° C. Then, nitrogen purging was performed such that the oxygen concentration became about 0.1% by volume. In this state, the coating layer was irradiated with ultraviolet rays at an illuminance of 400 mW/cm$^2$ and an irradiation amount of 500 mJ/cm$^2$ by using a 160 W/cm air-cooled metal halide lamp (manufactured by EYE GRAPHICS Co., Ltd) such that the dried coating layer was cured. In this way, a hardcoat layer was formed and then rolled up.

The prepared hardcoat films S-1 to S-24 were evaluated by the following evaluation method.

Film Thickness of Hardcoat Layer

By using a contact-type film thickness meter, the film thickness of the hardcoat film was measured. Then, the thickness of the support measured by the same method was subtracted from the film thickness of the hardcoat film, thereby calculating the film thickness of the hardcoat layer. In all of the hardcoat films S-1 to S-24, the film thickness of the hardcoat layer was 6.0 μm.

{Surface Condition Uniformity of Hardcoat Layer}

Between the surfaces of the support of the hardcoat film, a surface (rear surface) opposite to the hardcoat layer side was painted with a black marking pen so as to prevent reflection. Then, under a three-wavelength fluorescence lamp including a diffuser panel on the front thereof, a front surface (surface of the hardcoat layer side) of the hardcoat film was observed. The hardcoat film was visually observed from the front surface and evaluated based on the following evaluation standards.

The hardcoat films grades A to C according to the following evaluation standards were considered acceptable.

A: interference fringes were not observed.

B: extremely slight interference fringes were observed but were negligible.

C: although interference fringes were observed in places, the hardcoat film was acceptable as a product.

D: interference fringes seriously occurred and will cause problems.

(Alkali Treatment for Hardcoat Film)

The prepared hardcoat film was immersed for 2 minutes in a 1.5 mol/L aqueous NaOH solution kept at 45° C., and then the film was washed with water. Then, the film was immersed for 15 seconds in a 0.1 mol/L aqueous sulfuric acid solution at 30° C. and then washed with flowing water for 100 seconds such that the film became neutral. Thereafter, by using an air knife, water was repeatedly blown off three times. After water was removed, the hardcoat film was dried by being allowed to stay in a drying zone with a temperature of 90° C. for 60 seconds, thereby performing an alkali treatment (saponification treatment) on the hardcoat film.

{Water Contact Angle}

By using a contact angle meter ["CA-X" type contact angle meter, manufactured by Kyowa Interface Science Co., LTD.], in a dry state (20° C., relative humidity of 65%), a liquid droplet having a volume of 3 μL was formed at the tip of the stylus by using pure water as a liquid. The stylus was brought into contact with the surface of the hardcoat layer of the hardcoat film having undergone the alkali treatment such that a liquid droplet was formed on the hardcoat layer. At a point in time when 10 seconds elapsed from the dropping, by using the angle formed between a tangent touching the liquid surface and the film surface at a spot in which the hardcoat layer came into contact with the liquid, an angle of a side where the liquid existed was measured and taken as a contact angle. The results were evaluated according to the following standards. The hardcoat films graded A to C were considered acceptable, and those graded D were considered unacceptable.

A: the contact angle was equal to or smaller than 50°.

B: the contact angle was greater than 50° and equal to or smaller than 60°.

C: the contact angle was greater than 60° and equal to or smaller than 75°.

D: the contact angle was greater than 75°.

The results are shown in the following Table 2.

TABLE 2

| | Hardcoat film | Hardcoat layer coating solution | Polymer | Support | Film thickness of hardcoat layer (μm) | Surface condition uniformity | Contact angle after alkali treatment |
|---|---|---|---|---|---|---|---|
| Example 1 | S-1 | A-1 | B-1 | TJ25 | 6.0 | A | A |
| Example 2 | S-2 | A-2 | B-2 | TJ25 | 6.0 | A | A |
| Example 3 | S-3 | A-3 | B-3 | TJ25 | 6.0 | A | A |
| Example 4 | S-4 | A-4 | B-4 | TJ25 | 6.0 | A | A |
| Example 5 | S-5 | A-5 | B-5 | TJ25 | 6.0 | A | C |
| Example 6 | S-6 | A-6 | B-6 | TJ25 | 6.0 | A | C |
| Example 7 | S-7 | A-7 | B-7 | TJ25 | 6.0 | A | A |
| Example 8 | S-8 | A-8 | B-8 | TJ25 | 6.0 | A | B |
| Example 9 | S-9 | A-9 | B-9 | TJ25 | 6.0 | A | B |
| Example 10 | S-10 | A-10 | B-10 | TJ25 | 6.0 | A | C |
| Example 11 | S-11 | A-11 | B-11 | TJ25 | 6.0 | C | C |
| Example 12 | S-12 | A-12 | B-12 | TJ25 | 6.0 | A | C |
| Example 13 | S-13 | A-13 | B-13 | TJ25 | 6.0 | A | B |
| Example 14 | S-14 | A-14 | B-14 | TJ25 | 6.0 | B | A |
| Example 15 | S-15 | A-15 | B-15 | TJ25 | 6.0 | C | A |
| Example 16 | S-16 | A-16 | B-16 | TJ25 | 6.0 | A | C |
| Example 17 | S-17 | A-17 | B-17 | TJ25 | 6.0 | B | C |
| Example 18 | S-18 | A-18 | B-18 | TJ25 | 6.0 | B | A |
| Example 19 | S-19 | A-19 | B-19 | TJ25 | 6.0 | B | A |
| Comparative Example 1 | S-20 | A-20 | C-1 | TJ25 | 6.0 | A | D |

TABLE 2-continued

| | Hardcoat film | Hardcoat layer coating solution | Polymer | Support | Film thickness of hardcoat layer (μm) | Surface condition uniformity | Contact angle after alkali treatment |
|---|---|---|---|---|---|---|---|
| | | | | | | Evaluation result | |
| Comparative Example 2 | S-21 | A-21 | C-2 | TJ25 | 6.0 | B | D |
| Comparative Example 3 | S-22 | A-22 | C-3 | TJ25 | 6.0 | D | D |
| Comparative Example 4 | S-23 | A-23 | C-4 | TJ25 | 6.0 | D | C |
| Comparative Example 5 | S-24 | A-24 | C-5 | TJ25 | 6.0 | C | D |

As is evident from Table 2, the hardcoat films, which are examples of the present invention and formed using the film forming compositions (hardcoat layer coating solutions A-1 to A-19) containing the polymers B-1 to B-19 having the repeating unit represented by General Formula (I), have excellent surface condition uniformity and a small contact angle after the alkali treatment and exhibit high hydrophilicity, that is, excellent lamination properties with respect to other layers.

The film forming composition of the present invention makes it possible to form a film which has excellent surface condition uniformity and can be improved in terms of lamination properties with respect to other layers by a simple treatment. Furthermore, according to the present invention, it is possible to obtain a hardcoat film and a polarizing plate having a film formed of the aforementioned composition. In addition, the method for manufacturing a hydrophilized hardcoat film of the present invention makes it possible to manufacture a hydrophilized hardcoat film which has excellent surface condition uniformity and exhibits excellent lamination properties with respect to other layers.

Hitherto, the present invention has been described with reference to detailed or specific embodiments. Those skilled in the related art clearly know that various modifications or corrections can be added to the present invention without departing from the idea and the scope of the present invention.

What is claimed is:

1. A film forming composition comprising:
    a polymer having a repeating unit represented by General Formula (I); and
    a curable compound,

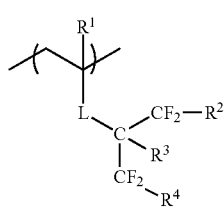

(I)

in General Formula (I), $R^1$ represents a hydrogen atom or an alkyl group having 1 to 20 carbon atoms, L represents an ester bond, an ether bond, a phenylene group, or an amide bond, $R^2$ and $R^4$ each independently represent a hydrogen atom, a halogen atom, an alkyl group having 1 to 20 carbon atoms, or a halogenated alkyl group having 1 to 20 carbon atoms, and $R^3$ represents a hydrogen atom or a substituent,
    wherein provided that a total solid content of the film forming composition is 100% by mass, a content of the polymer having the repeating unit represented by General Formula (I) in the film forming composition is 0.01% to 1% by mass.

2. The film forming composition according to claim 1, wherein the polymer further has a repeating unit represented by General Formula (II),

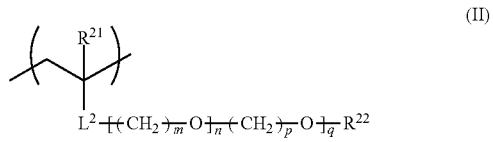

(II)

in General Formula (II), $R^{21}$ represents a hydrogen atom or an alkyl group having 1 to 20 carbon atoms, $R^{22}$ represents a hydrogen atom, an alkyl group having 1 to 20 carbon atoms, or an aryl group having 6 to 12 carbon atoms, $L^2$ represents an ester bond, an ether bond, a phenylene group, or an amide bond, m and p each independently represent an integer of 1 to 4, n represents a number of 1 to 30, and q represents a number of 0 to 30.

3. The film forming composition according to claim 1, wherein a content rate of fluorine atoms in the polymer with respect to a total mass of the polymer is equal to or higher than 5% by mass and equal to or lower than 80% by mass.

4. The film forming composition according to claim 1, wherein in the polymer, a content rate of the repeating unit represented by General Formula (I) with respect to the total mass of the polymer is 3% to 100% by mass.

5. A hardcoat film comprising:
    a film formed of the film forming composition according to claim 1.

6. A polarizing plate comprising:
    the hardcoat film according to claim 5.

7. A method for manufacturing a hydrophilized hardcoat film, comprising:
    a step of forming a hardcoat film by coating a support with the film forming composition according to claim 1; and
    a step of performing an alkali treatment on the hardcoat film.

* * * * *